(No Model.)
J. HEIBLING.
PROCESS OF MAKING POTASH ALUM AND ALUMINA.
No. 521,712. Patented June 19, 1894.
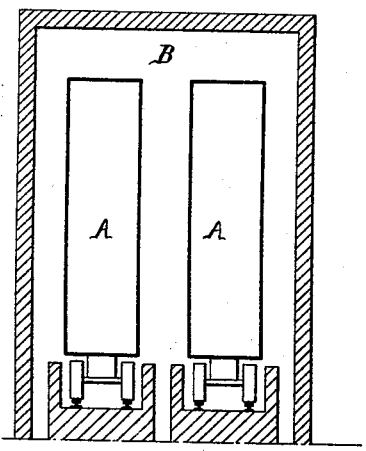
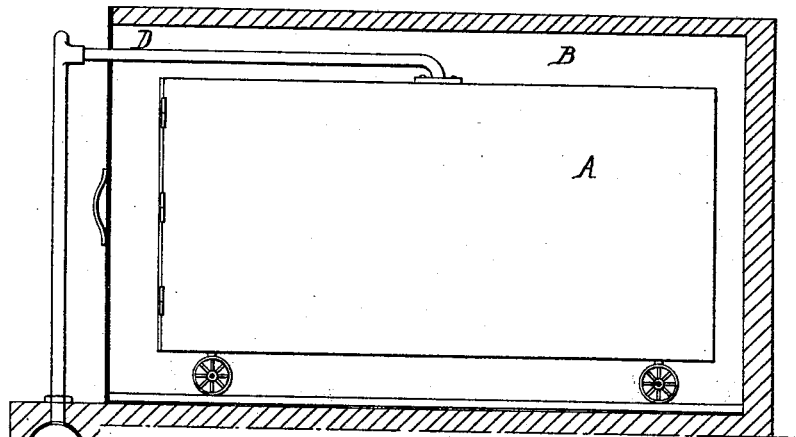
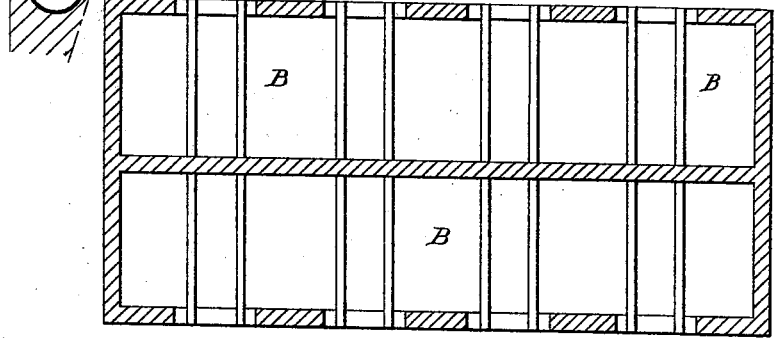
WITNESSES:
George Baumann
Edith J. Griswold
INVENTOR
Joseph Heibling
BY
Howson and Howson
his ATTORNEYS.

UNITED STATES PATENT OFFICE.

JOSEPH HEIBLING, OF PARIS, FRANCE.

PROCESS OF MAKING POTASH ALUM AND ALUMINA.

SPECIFICATION forming part of Letters Patent No. 521,712, dated June 19, 1894.

Application filed February 24, 1893. Serial No. 463,545. (No specimens.)

*To all whom it may concern:*

Be it known that I, JOSEPH HEIBLING, a citizen of the Republic of France, residing in Paris, France, have invented a new and useful Method for the Manufacture of Potash Alum and Alumina, of which the following is a specification.

This invention relates to the manufacture of potash alum by exposing a mixture of clay, sulfate of ammonia and sulfate of potash to a temperature of about 300° centigrade, and obtaining alumina by treating the said potash alum with a lye as hereinafter described.

In carrying out this invention in practice the operations are conducted as next hereinafter described, but I do not limit myself to the details which may be modified according to circumstances without affecting the principle of my invention.

A clay is employed containing a known percentage or proportion of alumina and in proportion to the alumina therein three molecular proportions of sulfate of ammonia and one molecular proportion of sulfate of potash are mixed therewith. These materials are first stirred or kneaded and afterward made up or molded in the form of hollow bricks or blocks in a suitable brick making machine for example. The hollow blocks thus obtained may be piled in a receptacle which can be made of sheet iron coated with tar or pitch and carried upon a truck running on rails or they may be piled directly on the truck if preferred, according to the construction of the furnace.

In the accompanying drawings, Figure 1 is a cross sectional elevation; Fig. 2 a longitudinal section, and Fig. 3 a plan view of a furnace in which the material may be treated.

When the blocks are placed in receptacles A carried upon trucks the latter are placed in a furnace or heating chamber B maintained at a temperature of from about 275° to 300° centigrade, each receptacle A being placed in communication with the exterior by means of a discharge pipe D. In case the blocks are placed directly upon the trucks the latter are taken directly into the heating chamber maintained at the aforesaid temperature, the said chamber being closed and communicating with the exterior through a discharge pipe. At the temperature specified the sulfate of ammonia is decomposed; the ammonia escapes through the discharge pipes and can be collected in an ordinary ammonia condenser. The sulfuric acid of the sulfate of ammonia passes at first to the sulfate of potash which becomes acid sulfate of potash and the latter in the presence of the alumina in the clay at the specified temperature becomes neutralized by the alumina and forms a double sulfate of alumina and potash or potash alum. The operation may occupy from about two to four hours according to the thickness of the mass and the division or arrangement of the hollow blocks. It is known to be terminated when the escape of ammonia ceases. The truck is then moved from the furnace and its contents are discharged into a trough or basin containing a sufficient quantity of water, the temperature of which is raised by the presence of the heated mass of materials. On stirring the blocks crumble and the potash alum enters into solution.

The solution containing the residues of the clay is treated in a centrifugal machine acting as a filter and is collected in a clear condition along with the washing water in a second basin or trough in which the iron is eliminated in the form of Prussian blue by adding yellow prussiate of potash. The materials being treated in a centrifugal machine the alkaline prussiate is regenerated by treating the residue of Prussian blue with alkaline carbonate in the usual way. The clear liquid free from iron is delivered into a third basin or receptacle in which the whole of the ammonia given off in the distilling process is added to it. The result of this treatment is that the whole of the alumina is precipitated. After treatment in the centrifugal machine the alumina is dried, or in case the sulfate is to be obtained, it is placed in sulfuric acid. The liquid remaining contains the whole of the regenerated sulfate of ammonia and sulfate of potash employed in the operation. This liquid is treated in an evaporating apparatus with triple effect of the Picard or other system in order to reduce its volume as much as possible and can be used again for treating a fresh supply of the clay. The alkaline carbonate employed to regenerate the prussiate of potash is recovered in the form of a useful sulfate. Prussian blue treated in the ordinary method by means of carbonate of potash regenerates ferrocyanide of potash and this serving to precipitate sulfate of iron, the potassium of the ferrocyanide returns again to sulfate of potash. The residue of the clay consists of almost pure silica and can be used for making highly refractory bricks for Siemens furnaces and metallurgical purposes.

Acid sulfate of potash obtained in the first place either by heating a mixture of the two salts aforesaid or otherwise may be employed in place of the mixture of the two sulfates but is less advantageous.

I claim as my invention—

1. The process consisting in molding into blocks a mixture of clay, sulfate of potash and sulfate of ammonia, and exposing the said blocks to a temperature of from 275° to 300° centigrade, substantially as set forth.

2. The process consisting in mixing clay, sulfate of potash and sulfate of ammonia, exposing the mixture to a temperature of from 275° to 300° centigrade and allowing the ammonia to pass off, dissolving the mixture, then eliminating the iron and subsequently precipitating the alumina.

3. The process consisting in mixing clay with sulfate of ammonia and sulfate of potash, heating this mixture until the ammonia is driven off, filtering, eliminating the iron and finally adding the ammonia previously driven off, whereby the alumina is precipitated, and the sulfate of ammonia and the sulfate of potash are regenerated.

In testimony whereof I have signed my name to this specification in the presence of two subscribing witnesses.

JOSEPH HEIBLING.

Witnesses:
CHARLES DOUY,
ROBT. M. HOOPER.